UNITED STATES PATENT OFFICE.

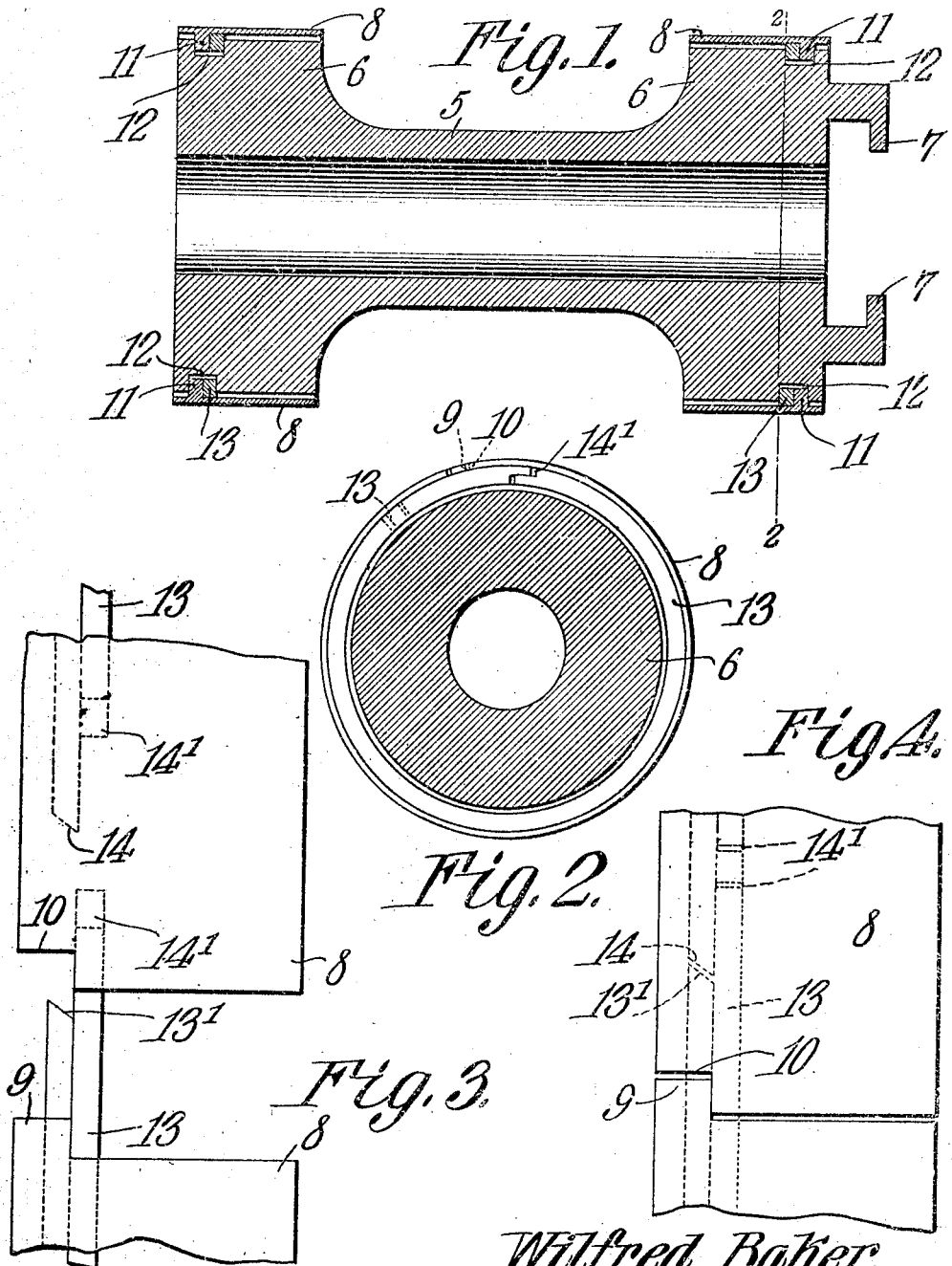

WILFRED BAKER, OF ABERDEEN, SOUTH DAKOTA.

METAL STEAM-PACKING RING.

No. 870,709.

Specification of Letters Patent.

Patented Nov. 12, 1907.

Application filed March 6, 1907. Serial No. 360,857.

*To all whom it may concern:*

Be it known that I, WILFRED BAKER, a citizen of the United States, residing at Aberdeen, in the county of Brown and State of South Dakota, have invented a new and useful Metal Steam-Packing Ring, of which the following is a specification.

This invention relates to packing rings and more particularly to that general class of packing rings especially designed for use in connection with the piston valves of steam engines and the like.

The object of the invention is to provide a packing ring having a broad bearing surface for engagement with the valve casing thereby to prevent the ring from entering the steam ports and impeding the movement of the piston valve.

A further object of the invention is to provide a packing ring having a supplemental or retaining ring associated therewith and forming a closure for the lap or joint in the main ring.

A still further object of the invention is to generally improve this class of devices so as to increase their utility, durability and efficiency.

Further objects and advantages will appear in the following description, it being understood that various changes in form, proportions and minor details of construction may be resorted to within the scope of the appended claims.

In the accompanying drawings forming a part of this specification: Figure 1 is a longitudinal sectional view of a piston valve provided with a packing constructed in accordance with my invention. Fig. 2 is a transverse sectional view taken on the line 2—2 of Fig. 1. Fig. 3 is a top plan view of the packing with the adjacent edges thereof separated. Fig. 4 is a similar view showing the parts assembled.

Similar numerals of reference indicate corresponding parts in all of the figures of the drawings.

The improved packing is principally designed for attachment to the piston valves of steam engines and the like and by way of illustration is shown in connection with a piston valve of the ordinary construction in which 5 designates the valve having its central portion reduced to form oppositely disposed enlarged heads or disks 6 one of which is provided with laterally extending under cut ribs 7 for connection with the usual valve stem.

The main packing ring 8 is preferably formed of a single piece of spring metal one end of which is provided with a longitudinal lip 9 adapted to enter a corresponding recess 10 formed in the opposite end of the ring thereby to form a lap joint at the juncture of said ends.

The inner periphery of the ring 8 is provided with an annular inwardly extending flange 11 which engages an annular groove 12 formed in the head 6 and thus serves to center the ring on the head and effectually prevent lateral movement of the same.

Attention is here called to the fact that the ring 8 is of the same width as the head 6 so as to form a broad bearing surface for engagement with the valve casing and thus prevent the packing ring from expanding and entering the ports as the piston is reciprocated within the valve casing.

The annular groove 12 is preferably twice the width of the flange 11 and seated in said groove and bearing against the flange 11 is a supplemental or retaining ring 13 which serves to normally and yieldably support the ring 8 in engagement with the interior walls of the valve casing.

One end of the annular flange or projection 11 projects longitudinally beyond the lip 9 and is provided with an inclined or beveled face 13' for engagement with the correspondingly inclined beveled face 14 of the adjacent end of the flange when the packing ring is placed in position on the piston.

The adjacent ends of the retaining ring 13 are provided with a step joint 14' which is preferably disposed in advance of the inclined ends 13 and 14 of the flange 11 thereby forming a steam tight joint. The annular flange 11 is preferably positioned adjacent the outer edge of the packing ring 8 so as to form a relatively small chamber between the flange and the end of the piston and thus prevent the steam from unduly expanding the ring and causing excessive friction between said ring and the valve casing.

From the foregoing description it will be seen that there is provided an extremely simple, inexpensive and efficient device admirably adapted for the attainment of the ends in view.

Having thus described the invention what is claimed is:

1. A piston having oppositely disposed heads, split packing rings of the same width as the heads surrounding the latter and each having its abutting faces provided with a lap joint, that portion of the rings between the opposite ends thereof being uninterrupted to form a continuous bearing surface and a retaining ring carried by each head and provided with a lap joint, the lap joints of the packing and retaining rings being disposed in staggered relation.

2. A piston having an enlarged head provided with an annular seating groove, a split packing ring having a continuous bearing surface surrounding the head and of the same width of the latter, an annular flange extending inwardly from the packing ring and seated in said groove, and a retaining ring interposed between the flange and the adjacent wall of the groove and bearing against one side of the flange.

3. A piston having a head provided with an annular seating groove, a packing ring surrounding the head and having its abutting ends provided with a lap joint, an annular flange extending inwardly from the ring and seated in said groove, and a retaining ring interposed between the flange and the adjacent wall of the groove and having its abutting ends provided with a lap joint, the lap joint of the retaining ring and packing ring being disposed in staggered relation.

4. A piston having a seating groove, a packing ring surrounding the piston and having its abutting ends provided with a lap joint, a flange spaced inwardly from one edge of the packing ring and extending in said groove, and an expansible retaining ring seated in said groove and having its abutting ends provided with a lap joint, said lap joints being disposed in staggered relation.

5. A piston provided with a circumferential annular groove, a packing ring surrounding the piston and having one end thereof provided with a longitudinal lip adapted to engage a corresponding recess formed in the adjacent end of the ring, an annular flange formed on said ring and seated in the groove, and an expansible retaining ring interposed between the flange and the adjacent wall of the groove and having its abutting ends provided with a lap joint, the lap joint of the retaining ring being disposed in advance of the joint of the packing ring.

6. A piston having an annular groove formed therein, a packing ring surrounding the piston and having one end thereof provided with a longitudinal lip adapted to engage a recess formed on the adjacent ring and provided with an annular flange seated in said groove, one end of said flange being extended longitudinally beyond the lip for engagement with the adjacent end of the flange, and an expansible retaining ring interposed between the annular flange and the adjacent wall of the groove and having its split end disposed in advance of the meeting faces of the annular flange.

7. A piston having an enlarged head provided with an annular seating groove, a split packing ring of the same width as the head surrounding the latter, one end of the ring being provided with a longitudinal lip adapted to engage a corresponding recess formed in the face of said ring, an annular flange formed integral with the packing ring and seated in the groove in the piston head, one end of the flange being extended longitudinally beyond the lip and having its terminal inclined or beveled for engagement with the correspondingly inclined terminal of the adjacent end of the flange, and a split retaining ring interposed between the flange and the adjacent wall of the seating groove and provided with over-lapping ends, the meeting ends of the retaining ring and flange being disposed one in advance of the other.

In testimony that I claim the foregoing as my own, I have hereto affixed my signature in the presence of two witnesses.

WILFRED BAKER.

Witnesses:
H. A. GLAU,
H. A. REHFELD.